(12) United States Patent
Fritzer et al.

(10) Patent No.: US 11,913,506 B2
(45) Date of Patent: Feb. 27, 2024

(54) METHOD FOR THE OPEN-LOOP CONTROL OF AN ELECTRICALLY CONTROLLABLE VALVE IN A VEHICLE TRANSMISSION

(71) Applicant: ZF Friedrichshafen AG, Friedrichshafen (DE)

(72) Inventors: Anton Fritzer, Markdorf (DE); Thilo Schmidt, Meckenbeuren (DE); Andreas Schmidt, Ravensburg (DE); Valentine Vincent, Friedrichshafen (DE); Christoph Köhler, Bodolz (DE); Jonas Knör, Erbach (DE); Michael Miller, Leutkirch (DE); Mario Hasel, Wangen (DE); Jakob Mayer, Kressbronn (DE); Christian Hunger, Eriskirch (DE); Fabian Schöniger, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/330,804

(22) Filed: Jun. 7, 2023

(65) Prior Publication Data

US 2023/0400069 A1    Dec. 14, 2023

(30) Foreign Application Priority Data

Jun. 8, 2022  (DE) .................... 10 2022 205 851.8

(51) Int. Cl.
*F16D 48/06*    (2006.01)
*F16H 61/06*    (2006.01)
*F16H 61/00*    (2006.01)

(52) U.S. Cl.
CPC .... *F16D 48/066* (2013.01); *F16D 2500/1027* (2013.01); *F16D 2500/10412* (2013.01);
(Continued)

(58) Field of Classification Search
CPC .... F16H 61/705; F16H 61/061; F16H 61/068; F16H 61/0025; F16H 61/0021; F16D 48/06; F16D 2500/3024; F16D 2500/3025
(Continued)

(56) References Cited

U.S. PATENT DOCUMENTS

2009/0105039 A1\*    4/2009    Sah .................. B60W 20/00
                                                     903/946
2019/0048998 A1    2/2019    Harada et al.
(Continued)

OTHER PUBLICATIONS

German Search Report DE 10 2022 205 851.8, dated Mar. 6, 2023. (10 pages).

*Primary Examiner* — Roger L Pang
(74) *Attorney, Agent, or Firm* — Dority & Manning, P.A.

(57) ABSTRACT

A vehicle transmission includes a hydraulic circuit and a control unit. The control unit is configured to: obtain (20) a target pressure specification; convert (26) the target pressure specification into a target volume flow rate; determine (42) a valve volume flow rate as a function of the target volume flow rate and as a function of parameters that represent system properties of the hydraulic circuit; determine (46) a pressure drop at a valve due to flow forces as a function of the valve volume flow rate; determine (48) a compensated valve output pressure as a function of the valve volume flow rate and the pressure drop; determine (58) the electric control current as a function of the compensated valve output pressure; and activate a valve with the electric control current.

12 Claims, 2 Drawing Sheets

(52) U.S. Cl.
CPC .............. *F16D 2500/3024* (2013.01); *F16D 2500/3025* (2013.01); *F16H 61/0021* (2013.01); *F16H 61/061* (2013.01)

(58) Field of Classification Search
USPC .............. 701/57, 58; 477/156, 157, 163, 64
See application file for complete search history.

(56) References Cited

U.S. PATENT DOCUMENTS

| | | | |
|---|---|---|---|
| 2020/0309255 A1* | 10/2020 | Kim | F16H 61/0031 |
| 2021/0140536 A1* | 5/2021 | Nakasone | F16H 61/0031 |
| 2023/0072877 A1* | 3/2023 | Gelmini | F16H 61/66 |

* cited by examiner

METHOD FOR THE OPEN-LOOP CONTROL OF AN ELECTRICALLY CONTROLLABLE VALVE IN A VEHICLE TRANSMISSION

CROSS-REFERENCE TO RELATED APPLICATION

The present application is related and has right of priority to German Patent Application No. 102022205851.8 filed on Jun. 8, 2022, which is incorporated by reference in its entirety for all purposes.

FIELD OF THE INVENTION

The present invention relates generally to a method for the open-loop control of an electrically controllable valve in a vehicle transmission that includes a hydraulic circuit, wherein the valve sets a defined pressure in the hydraulic circuit as a function of a control current in order to selectively actuate a clutch. The invention also relates generally to a vehicle transmission that includes a control unit, which is designed to control a valve in a hydraulic circuit by way of an open-loop system in an appropriate way.

BACKGROUND

Modern vehicle transmissions have a plurality of clutches, which can be selectively disengaged or engaged in order to implement a transmission ratio that is desired for the driving operation at any given time. In a hydraulic control unit of the vehicle transmission, valves are activated for this purpose via a current specification, i.e., a particular electric control current. The valves set a defined target pressure of the particular associated clutches depending on the amperage. In known vehicle transmissions, the control current for each valve is determined in an electronic control unit via a pressure-current conversion on the basis of a defined target pressure, the target pressure specification. Various pressure offsets can be added to the target pressure specification prior to the pressure-current conversion in order to take into account dynamic effects of the valve and hysteresis effects of the clutch. The magnetic hysteresis of the valve can also be taken into account in the determination of the control current. The pressure to be set is therefore calculated in known vehicle transmissions from a determined target pressure and various pressure offsets, which are intended to compensate for certain pressure losses. Typically, the pressure offsets are based on empirical data and this is a full pilot control. The particular actual pressure is estimated and represented via temporal filtering.

Modern motor vehicles are operated with hybrid drives to an increasing extent in order to reduce the local emissions of internal combustion engines and simultaneously make usual ranges possible. For this purpose, at least one electric drive must be integrated into the drive train of the vehicle in addition to the internal combustion engine. It is therefore desired and required that the installation space of known vehicle transmissions be reduced. As a result, efforts are underway to reduce the size of the hydraulic circuit and, consequently, to use valves having smaller opening cross-sections. It has been shown that these types of measures require that the activation of the valves be adapted. Comfortable and reliable gear ratio changes are no longer ensured with the known methods for the open-loop control of clutch valves in a vehicle transmission.

SUMMARY OF THE INVENTION

In view thereof, example aspects of the present invention provide an alternative method for the open-loop control of clutch valves in a vehicle transmission and to provide an appropriate vehicle transmission. More particularly, example embodiments provide a method and a vehicle transmission, which make comfortable and reliable gear ratio changes possible with a smaller hydraulic circuit and with smaller valve cross-sections.

According to a first example aspect of the invention, a method for the open-loop control of an electrically controllable valve in a vehicle transmission that includes a hydraulic circuit is provided, wherein the valve sets a defined pressure in the hydraulic circuit as a function of a control current in order to selectively actuate a clutch. The method includes the following steps:

- obtaining a target pressure specification (p_Soll), which represents a desired target pressure in the hydraulic circuit,
- converting the target pressure specification (p_Soll) into a target volume flow rate (Q_soll),
- determining a valve volume flow rate (Q_Ventil) as a function of the target volume flow rate (Q_soll) and as a function of parameters that represent system properties (P_SysLim) of the hydraulic circuit, wherein the valve volume flow rate (Q_Ventil) represents a volume flow rate through the valve,
- determining a pressure drop at the valve due to flow forces as a function of the valve volume flow rate (Q_Ventil),
- determining a compensated valve output pressure (p_VentilSoll) as a function of the valve volume flow rate (Q_Ventil) and the pressure drop,
- determining an electric control current (i_Endstufe) as a function of the compensated valve output pressure (p_VentSoll), and
- activating the valve with the electric control current (i_Endstufe).

According to a further example aspect of the invention, a vehicle transmission includes a clutch, a hydraulic circuit, and a valve, which is designed to set a defined pressure in the hydraulic circuit as a function of a control current (i_Endstufe) in order to selectively actuate the clutch. The vehicle transmission also includes a control unit, which is designed to determine the control current (i_Endstufe), wherein the control unit is designed to carry out the following steps:

- obtaining a target pressure specification (p_Soll), which represents a desired target pressure in the hydraulic circuit,
- converting the target pressure specification (p_Soll) into a target volume flow rate (Q_soll),
- determining a valve volume flow rate (Q_Ventil) as a function of the target volume flow rate (Q_soll) and as a function of parameters that represent system properties (P_SysLim) of the hydraulic circuit, wherein the valve volume flow rate (Q_Ventil) represents a volume flow rate through the valve,
- determining a pressure drop at the valve due to flow forces as a function of the valve volume flow rate (Q_Ventil),
- determining a compensated valve output pressure (p_VentilSoll) as a function of the valve volume flow rate (Q_Ventil) and the pressure drop,
- determining the electric control current (i_Endstufe) as a function of the compensated valve output pressure (p_VentSoll), and
- activating the valve with the electric control current (i_Endstufe).

The above-described method and vehicle transmission are based, from a physical point of view, on the calculation and subsequent taking into account of a volume flow rate of the hydraulic fluid through the valve to be controlled by way of an open-loop system. In other words, the method and vehicle transmission no longer operate purely based on pressure. Rather, the volume flow rate through the valve is taken into account, preferably in addition to taking pressure values into account, for the determination of the control current.

The consideration of the volume flow rate makes it easier to take flow effects and, more particularly, flow forces in the hydraulic circuit and primarily at the valve into account when determining the control current. Since flow effects and, more particularly, flow forces influence the pressure conditions in a hydraulic circuit to a greater extent the smaller the cross-sections are in the hydraulic circuit, the flow effects have an increasingly stronger impact when the installation space is reduced as desired. The above-described method and vehicle transmission benefit from the simple taking into account of the flow effects, since the clutch pressure can be more efficiently and precisely adjusted in this way. The shifting characteristics of the vehicle transmission can also be very comfortably and reliably implemented in a compact design.

In one preferred example embodiment of the invention, the target pressure specification (p_Soll) is determined from a torque specification (m_Soll).

Advantageously, the target pressure specification (p_Soll) in this example embodiment can be calculated from a torque to be transmitted (m_Soll) at the clutch via a conversion using transfer factors. This has the advantage that the torque set at the transmission input can be directly calculated via a physical relationship with the clutch control. The example embodiment can be easily and efficiently implemented.

In one further example embodiment, an actual pressure (p_Ist) in the hydraulic circuit is determined, and the target volume flow rate (Q_soll) is determined as a function of the actual pressure (p_Ist).

This example embodiment implements a feedback loop in the method and vehicle transmission, as a result of which closed-loop control, instead of the previously implemented full pilot control, is achieved in a very simple and efficient way. The example embodiment contributes to the control current being set with consideration for the pressure conditions prevailing in the hydraulic circuit at any time. Fluctuating surroundings conditions, such as a current operating temperature, therefore have less of an impact on the shifting comfort and the reliability. In addition, the determination of the target volume flow rate (Q_soll) can be easily carried out using a feedback loop of this type by utilizing data that are already present in the vehicle transmission.

In one further example embodiment, the actual pressure (p_Ist) is estimated as a function of the valve volume flow rate (Q_Ventil).

This example embodiment offers the advantage that a specific pressure sensor in the hydraulic circuit can be dispensed with, even though this example embodiment can be implemented, in principle, in addition to an actual pressure measured using a pressure sensor. The example embodiment facilitates a cost-effective and compact implementation in a small installation space.

In one further example embodiment, a pressure differential (p_Diff) is determined as a function of the target pressure specification (p_Soll) and the actual pressure (p_Ist), and the target volume flow rate (Q_soll) is determined by utilizing the pressure differential (p_Diff).

In this example embodiment, the difference between the—preferably estimated or measured—actual pressure and the target pressure is used as a basis for determining the target volume flow rate (Q_Soll). The example embodiment makes it possible to determine the target volume flow rate (Q_Soll) fairly easily and quickly on the basis of data and values that are already available in known vehicle transmissions. This example embodiment therefore facilitates a cost-effective implementation.

In one further example embodiment, the pressure differential (p_Diff) is multiplied by a parameter that represents a clutch capacity of the clutch.

The clutch capacity is the maximum amount of torque that the clutch can transmit in the engaged state. The example embodiment makes it possible for the particular target volume flow rate (Q_Soll) to be determined very easily and quickly. Preferably, the difference between the actual pressure and the target pressure is converted into the target volume flow rate (Q_Soll) by utilizing a capacity characteristic curve, and the capacity characteristic curve is determined using a pressure-volume characteristic curve ascertained from experiments.

In one further example embodiment, the target volume flow rate (Q_soll) is limited as a function of an available amount of fluid (Q_VersLim) in order to attain a limited target volume flow rate (Q_PistReqLim), and the valve volume flow rate (Q_Ventil) is determined as a function of the limited target volume flow rate (Q_PistReqLim).

This example embodiment has the advantage that the determination of the control current is carried out under consideration of the amount of fluid that is currently available and, therefore, an override of the clutch system and a potential failure of the gear change operation due to a current inadequate amount of fluid can be avoided. The example embodiment therefore contributes to further increasing the reliability and the comfort of the vehicle transmission. More particularly, the gear change operation in this embodiment is therefore carried out as a function of the availability of an oil supply and the pressure/volume specification is advantageously appropriately limited in order to avoid an override of the system.

In one further example embodiment, a supply pump provides fluid for the hydraulic circuit and the supply pump is controlled as a function of the target volume flow rate (Q_soll).

This example embodiment has the advantage that, on the one hand, a direct demand is transmitted to the fluid supply system (oil supply system), and so, for example, it becomes possible to switch a fluid flow from a two-circuit system to a single-circuit system and/or the supply pump can be controlled to a higher rotational speed if the fluid demand cannot be covered in any other way. This example embodiment also highly advantageously contributes to a reliable and efficient operation of the new vehicle transmission.

In one further example embodiment, the valve volume flow rate (Q_Ventil) is determined as a function of leakages (volg_Leckage).

This example embodiment also highly advantageously contributes to a reliable and efficient operation of the new vehicle transmission, since individual pressure losses due to wear, assembly tolerances, and other effects are advantageously taken into account in the determination of the control current.

In one further example embodiment, the compensated valve output pressure (p_VentilSoll) is limited as a function of valve-specific properties, more particularly valve-specific dynamic properties (p_VentLim), in order to obtain a final pressure specification (p_VentZiel), and the electric control current (i_Endstufe) is determined as a function of the final pressure specification (p_VentZiel).

The ascertained output pressure (p_VentSoll) is subject to system limits, such as, for example, the maximally electrically achievable pressure (MaxDruck) and/or the particular maximally achievable pressure gradients. The example embodiment includes these individual system limits being taken into account in the determination of the control current in an easy way and, therefore, also contributes to a reliable and comfortable operation in an efficient way. Advantageously, the final pressure specification (p_VentZiel), which has been limited in this way, can be converted into the estimated volume flow rate (Q_Ist) by a back-calculation 1/(R1+R2). The estimated volume flow rate (Q_Ist) is advantageously entered into a pressure monitor and the actual pressure (p_Ist) can then be ascertained in an easy way by utilizing a pressure-volume characteristic curve stored in the pressure monitor. R1 denotes the hydraulic resistance of the line and R2 denotes the flow force component in the valve. By the inversion, the pressure-specific limitations can be back-calculated into the volume range in an efficient way.

In one further example embodiment, the electric control current (i_Endstufe) is also determined as a function of a current or magnetic hysteresis of the valve.

It is understood that the features of the invention, which are mentioned above and which will be described in greater detail in the following, are usable not only in the particular combination indicated, but rather also in other combinations or alone, without departing from the scope of the invention.

BRIEF DESCRIPTION OF THE DRAWINGS

Further features and advantages of the invention become clear from the following description of preferred exemplary embodiments with reference to the drawings, in which.

DETAILED DESCRIPTION

Figure 1A:
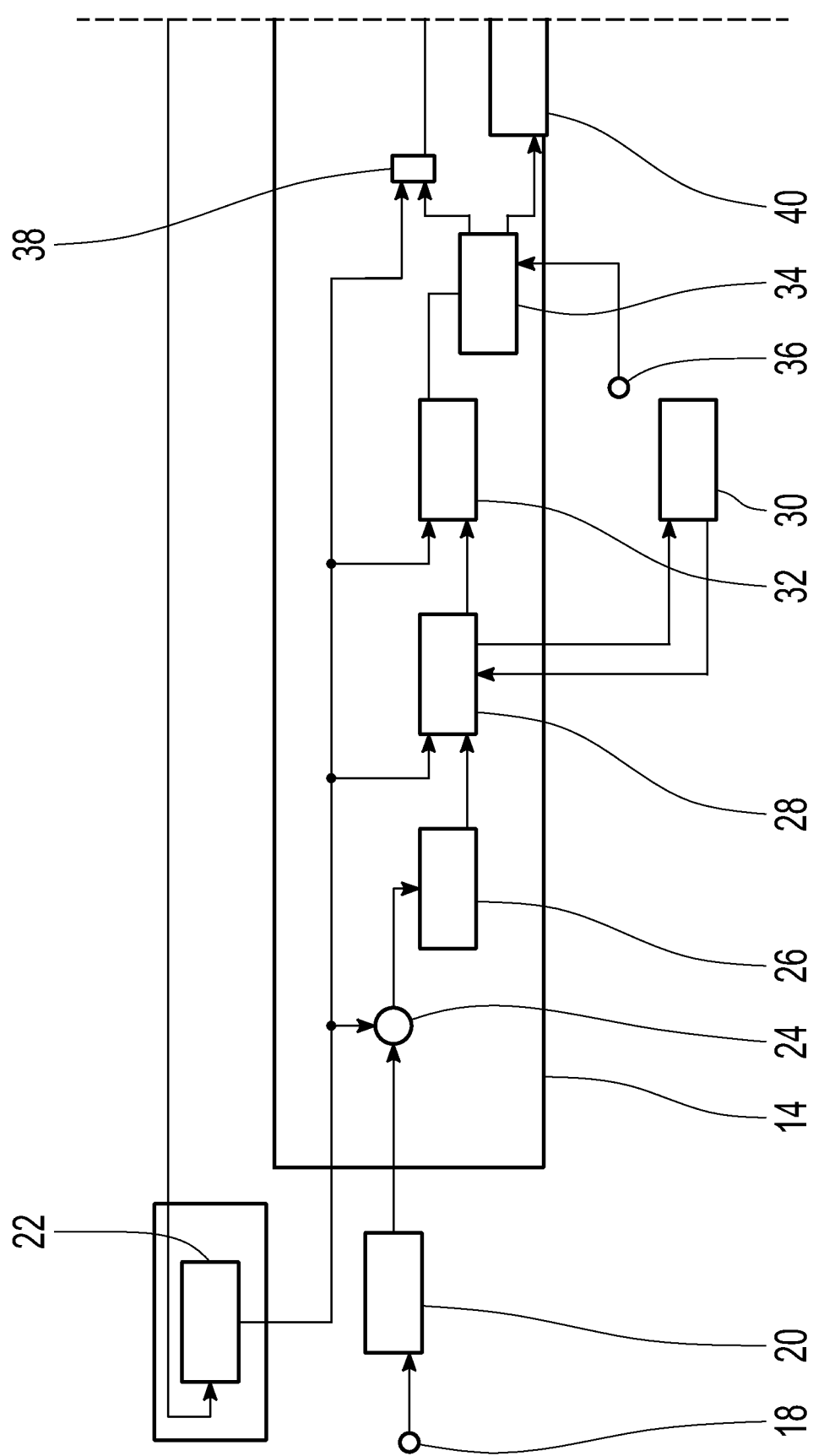
FIG. 1a shows a first portion of a function block diagram for explaining exemplary embodiments of the method and vehicle transmission.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1B:
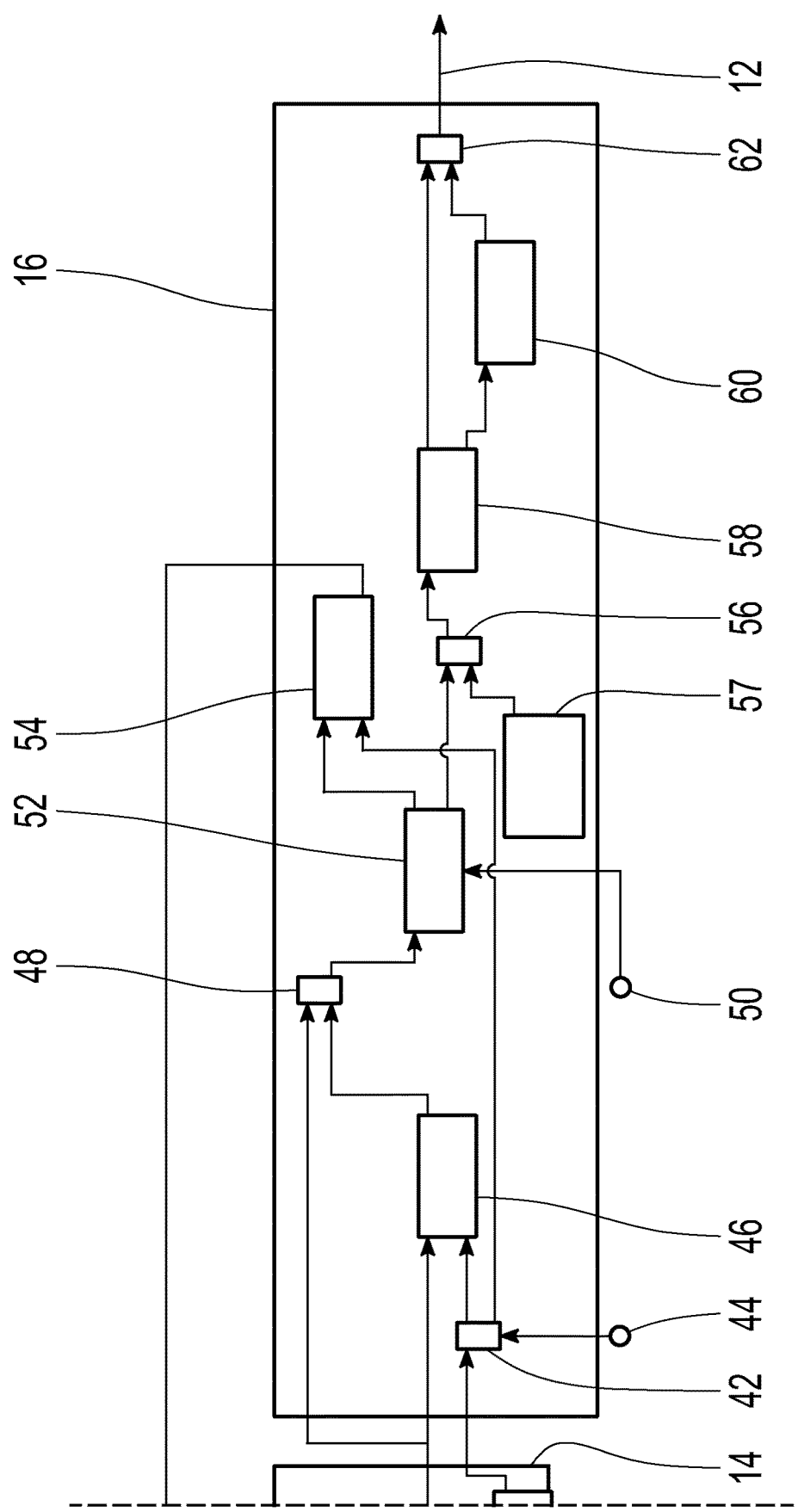
FIG. 1B shows a second portion of the function block diagram for explaining various exemplary embodiments.

FIGS. 1a and 1b together show a functional operating sequence of an exemplary embodiment 10 of a method, with which a control current 12 (i_Endstufe) is determined. The exemplary embodiment 10 contains multiple optional function blocks and is therefore representative for further exemplary embodiments, which can be implemented without and with a selection of the optional function blocks.

The control current 12 is used in an appropriate exemplary embodiment of the new vehicle transmission (not shown here) in order to activate a valve (not shown). By the valve, a clutch (not shown) in the vehicle transmission can be disengaged or engaged in a way known per se. The individual blocks in FIGS. 1a and 1b therefore also show functional units of a new electronic control unit for a vehicle transmission.

The method can be subdivided into two functional sections. A first functional section is shown and labeled with the reference number 14 in FIG. 1a. The functional section 14 contains an output-specific calculation, which can be carried out largely or entirely regardless of valve-specific properties. A second functional section 16 is shown and labeled with the reference number 16 in FIG. 1b. The functional section 16 contains a valve-specific calculation, with which the control current 12 (i_Endstufe) is determined on the basis of results from the first functional section 14.

Reference number 18 denotes an input at which a torque to be transmitted (m_Soll) is provided as an input datum. In the function block 20, the torque (m_Soll) is converted into a target pressure specification (p_Soll) by defined transfer factors. Alternatively, the target pressure specification (p_Soll) can be provided directly as an input datum in other exemplary embodiments, and so the function block 20 is to be considered to be an optional function block. The transfer factors can be provided on the basis of empirically and/or theoretically ascertained data. The optional use of the torque to be transmitted (m_Soll) as an input datum has the advantage that the torque set at the transmission input can be directly calculated via a physical relationship with the clutch control.

Reference number 22 denotes an optional pressure monitor, which provides an estimated actual pressure (p_Ist) in the hydraulic circuit at the output of the optional pressure monitor. Alternatively or additionally, the actual pressure (p_Ist) in the hydraulic circuit could be determined by a pressure sensor.

In the function block 24, a pressure differential (p_Diff) is determined from the target pressure specification (p_Soll) and the estimated actual pressure (p_Ist). The pressure differential (p_Diff) is routed to a function block 26 in which a target volume flow rate (Q_Soll) is determined by utilizing a capacity characteristic curve. The capacity characteristic curve can be determined by utilizing a pressure-volume characteristic curve determined from experiments and provided in the form of a table. In a function block 28, this target volume flow rate can optionally and advantageously be compared with a current oil flow from the pump system of the hydraulic circuit, which is shown here on the basis of a function block 30 (volume flow rate manager), and limited. In the preferred exemplary embodiments, the volume flow rate manager 30 provides data to the function block 28, the data representing a volume flow rate limitation (Q_VersLim) from the oil supply system. Conversely, the function block 28 optionally provides the volume flow rate manager 30 in the preferred exemplary embodiments with data that represent a volume flow rate demand (Q_Bedarf). It is advantageous that, on the one hand, a direct demand is transmitted to the oil supply system, and so, for example, a switch of a fluid flow from a two-circuit system to a single-circuit system can be provoked via the volume flow rate manager 30 or, for example, a power-split pump (not shown here), of the type known per se from vehicle transmissions of the type in question, can be controlled to a higher rotational speed if the fluid demand cannot be covered in any other way. Conversely, it is advantageous that the oil supply system reports the current availability to the clutch control unit and the clutch control unit appropriately limits a pressure/volume specification in the function block 28 in order to avoid an override of the system.

The function block 28 therefore provides data at its output that represent a limited volume flow rate (Q_PistReqLim). These data are routed to a function block 32 in which a pressure drop across the feed lines can be optionally calculated and compensated for by the hydraulic resistance R1. A limited compensation of the hydraulic resistance (p_HydROff) is provided at the output of the function block 32. As is shown in FIG. 1a, the actual pressure (p_Ist) is advantageously routed to the function block 32 as a further input datum in order to determine the limited compensation of the hydraulic resistance (p_HydROff) in a pressure-based manner. The limited compensation of the hydraulic resistance (p_HydROff) from the output of the function block 32 is optionally limited in a function block 34 on the basis of further data 36 that represent the system limits (P_SysLim), such as, for example, on the basis of a maximum system pressure. The limited and compensated pressure data (p_HydRLimOff) at the output of the function block 34 are, on the one hand, added to the actual pressure (p_Ist) in a function block 38 and provided to a pressure-based path for the valve-specific calculation in the functional section 16. On the other hand, a back-calculation of the volume flow rate to be output (Q-Leitung) through the feed line is carried out in the function block 40 by inverting the hydraulic resistance 1/R1, and the volume flow rate to be output (Q-Leitung) is routed to a function block 42 in the functional section 16 (FIG. 1b).

Data representing leakages, for example, at sealing rings are optionally provided at the reference number 44. The appropriate volume flow rate losses are added to the volume flow rate (Q-Leitung) or subtracted from the volume flow rate (Q-Leitung) in the function block 42. At the output, the function block 42 therefore provides a volume flow rate (Q_Ventil) via the valve while taking into account leakages and power losses.

In the function block 46, the flow effects are compensated for by utilizing the hydraulic resistance R2 and by the compensated valve output pressure (p_ventilOut) from the output of the function block 38. The flow forces provide an indication of a pressure drop at the valve and can be compensated for in the function block 46 on the basis of the known volume flow rate. The function block 46 provides the compensation (p_StrOmKraftOff). This compensation (p_StrOmKraftOff) is routed to the function block 48, where it is subtracted from the valve output pressure (p_ventilOut). The function block 48 therefore provides a compensated pressure specification (p_VentilSoll) for the valve at the output of the function block 48. The pressure-specific limitations in the volume range (Q_Leitung) can therefore be back-calculated via the inversion of the hydraulic resistance 1/R1 in the function block 40. The volume flow rate (Q_Leitung) flows through the valve and can be utilized for calculating the flow forces at the valve.

The compensated pressure specification (p_VentilSoll), which has been determined in this way, is subject to further system limits, such as, for example, an achievable maximum pressure and/or maximum pressure gradients. The input data (p_VentSollLim) that represent these further system limits are optionally provided at the reference number 50 and used in the function block 52 for the further limitation.

The function block 52 provides a final pressure specification (p_VentZiel) from the volume flow rate at the output of the function block 52. This final pressure specification (p_VentZiel) is converted to the final volume flow rate (Q_Ist) via a back-calculation (1/(R1+R2)) in the function block 54. The final volume flow rate (Q_Ist) is entered into the pressure monitor 22 and the actual pressure (p_Ist) can then be ascertained by utilizing the stored pressure-volume characteristic curve. The actual pressure (p_Ist) is then routed to the function block 24 as an input datum.

Furthermore, the final pressure specification (p_VentZiel) is routed to a function block 56. In the function block 56, further pressure-based compensations 57 are optionally superimposed on the final pressure specification (p_VentZiel), the further pressure-based compensations 57 more particularly representing a clutch hysteresis and/or a supply pressure dependence. This yields the actuated clutch pressure (p_VentAkt) at the output of the function block 56. The actuated clutch pressure (p_VentAkt) is converted into the control current (i_Endstufe) via a pressure-current conversion in the function block 58. The control current (i_Endstufe) preferably also contains a hysteresis compensation according to function blocks 60, 62 in order to compensate for magnetization effects at the valve armatures.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 10 exemplary embodiment, control unit
12 control current
14 "output-specific calculation" functional section
16 "valve-specific calculation" functional section
18 "torque (m_Soll)" input
20 "conversion using transfer factors" function block
22 "pressure monitor" function block
24 "determination of pressure differential (p_Diff)" function block
26 "dynamics specifications—capacity characteristic curve" function block
28 "system limitations—oil supply system, orifices" function block
30 "volume flow rate manager" function block
32 "pressure drop across line" function block
34 "limitations" function block
36 system limits (P_SysLim)
38 function block
40 "back-calculation of output volume flow rate 1/R1" function block
42 function block
44 "sealing rings leakages" data
46 "flow force compensation (R2)" function block
48 function block
50 input data (p_VentSollLim)
52 "valve limitation" function block
54 "back-calculation of output volume flow rate 1/(R1+R2)" function block
56 function block
57 "pressure-based compensation (clutch hysteresis, supply pressure dependence, valve bodies inertial forces)" function block
58 "pressure to current conversion" function block
60 "flow hysteresis" function block
62 function block

The invention claimed is:

1. A method for the open-loop control of an electrically controllable valve in a vehicle transmission that includes a hydraulic circuit, wherein the valve sets a defined pressure in the hydraulic circuit as a function of a control current in order to selectively actuate a clutch, the method comprising:
   obtaining (20) a target pressure specification (p_Soll) that represents a desired target pressure in the hydraulic circuit;
   converting (26) the target pressure specification (p_Soll) into a target volume flow rate (Q_soll) of a fluid in the hydraulic circuit;
   determining (42) a valve volume flow rate (Q_Ventil) as a function of the target volume flow rate (Q_soll) and as a function of parameters (44) that represent system properties (P_SysLim) of the hydraulic circuit, wherein the valve volume flow rate (Q_Ventil) represents a volume flow rate through the valve;
   determining (46) a pressure drop at the valve due to flow forces as a function of the valve volume flow rate (Q_Ventil);
   determining (48) a compensated valve output pressure (p_VentilSoll) as a function of the valve volume flow rate (Q_Ventil) and the pressure drop;
   determining (58) the electric control current (i_Endstufe) as a function of the compensated valve output pressure (p_VentSoll); and
   activating the valve with the electric control current (i_Endstufe).

2. The method of claim 1, wherein the target pressure specification (p_Soll) is determined (20) from a torque specification (m_Soll).

3. The method of claim 1, further comprising determining an actual pressure (p_Ist) in the hydraulic circuit (22), wherein the target volume flow rate (Q_soll) is determined as a function of the actual pressure (p_Ist).

4. The method of claim 3, wherein the actual pressure (p_Ist) is estimated as a function of the valve volume flow rate (Q_Ventil).

5. The method of claim 3, further comprising determining a pressure differential (p_Diff) as a function of the target pressure specification (p_Soll) and the actual pressure (p_Ist), wherein the target volume flow rate (Q_soll) is determined by utilizing the pressure differential (p_Diff).

6. The method of claim 5, wherein the pressure differential (p_Diff) is multiplied by a parameter that represents a clutch capacity of the clutch.

7. The method of claim 1, wherein the target volume flow rate (Q_soll) is limited (28) as a function of an available amount of fluid (Q_VersLim) in order to attain a limited target volume flow rate (Q_PistReqLim), and the valve volume flow rate (Q_Ventil) is determined as a function of the limited target volume flow rate (Q_PistReqLim).

8. The method of claim 1, further comprising controlling a supply pump, which provides fluid for the hydraulic circuit, as a function of the target volume flow rate (Q_soll).

9. The method of claim 1, wherein the valve volume flow rate (Q_Ventil) is determined (42) as a function of leakages (volg_Leckage).

10. The method of claim 1, wherein the compensated valve output pressure (p_VentilSoll) is limited (52) as a function of valve-specific dynamic properties (p_VentLim) in order to obtain a final pressure specification (p_VentZiel), and wherein the electric control current (i_Endstufe) is determined as a function of the final pressure specification (p_VentZiel).

11. The method of claim 1, wherein the electric control current (i_Endstufe) is determined (60) as a function of a flow hysteresis of the valve.

12. A vehicle transmission, comprising:
   a clutch;
   a hydraulic circuit;
   a valve configured to set a defined pressure in the hydraulic circuit as a function of a control current (i_Endstufe) in order to selectively actuate the clutch; and
   a control unit configured to determine the control current (i_Endstufe), the control unit configured for
      obtaining (20) a target pressure specification (p_Soll) that represents a desired target pressure in the hydraulic circuit,
      converting (26) the target pressure specification (p_Soll) into a target volume flow rate (Q_soll),
      determining (42) a valve volume flow rate (Q_Ventil) as a function of the target volume flow rate (Q_soll) and as a function of parameters that represent system properties (P_SysLim) of the hydraulic circuit, wherein the valve volume flow rate (Q_Ventil) represents a volume flow rate through the valve,
      determining (46) a pressure drop at the valve due to flow forces as a function of the valve volume flow rate (Q_Ventil),
      determining (48) a compensated valve output pressure (p_VentilSoll) as a function of the valve volume flow rate (Q_Ventil) and the pressure drop,
      determining (58) the electric control current (i_Endstufe) as a function of the compensated valve output pressure (p_VentSoll), and
      activating the valve with the electric control current (i_Endstufe).

* * * * *